Nov. 11, 1969 — R. M. DAVIDSON — 3,477,141
NOTCHED CARD FOR TEACHING MACHINE
Filed Oct. 31, 1966
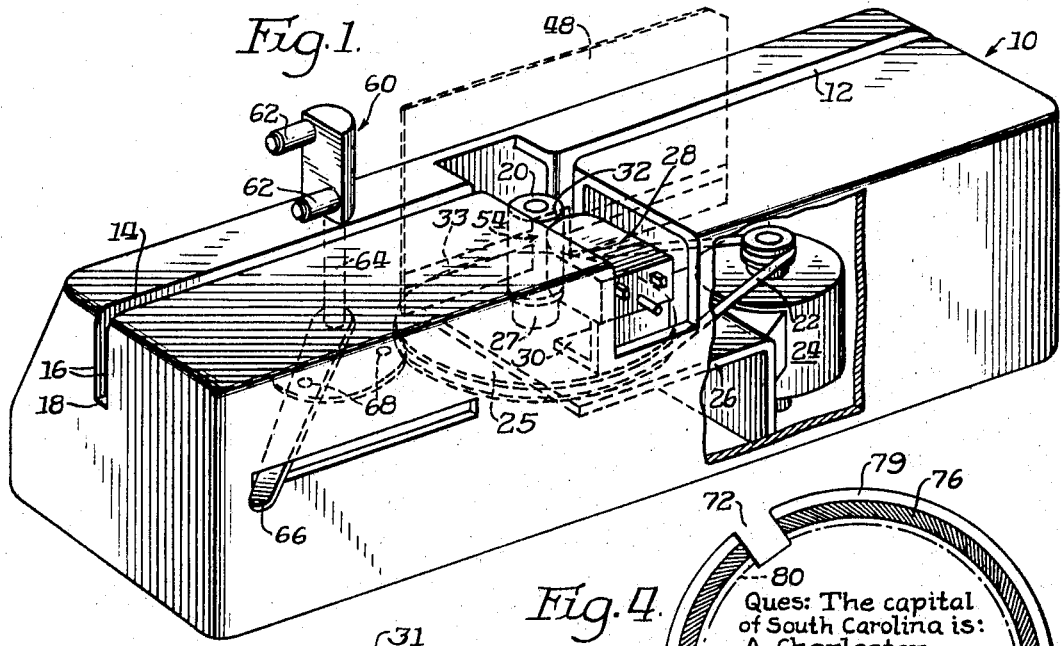
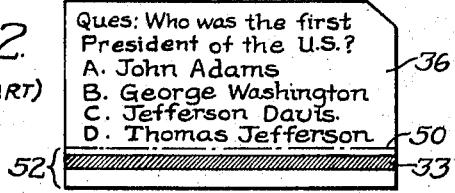
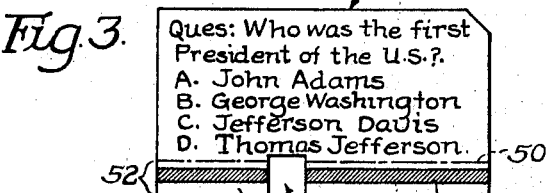
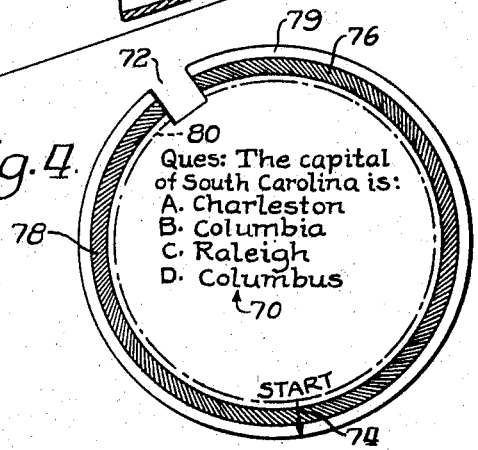
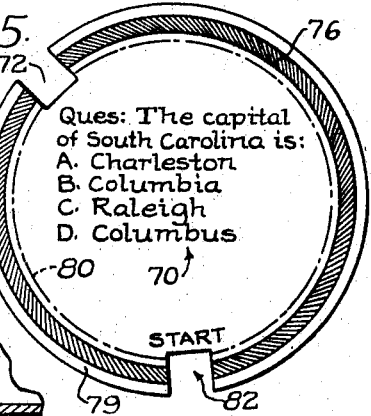
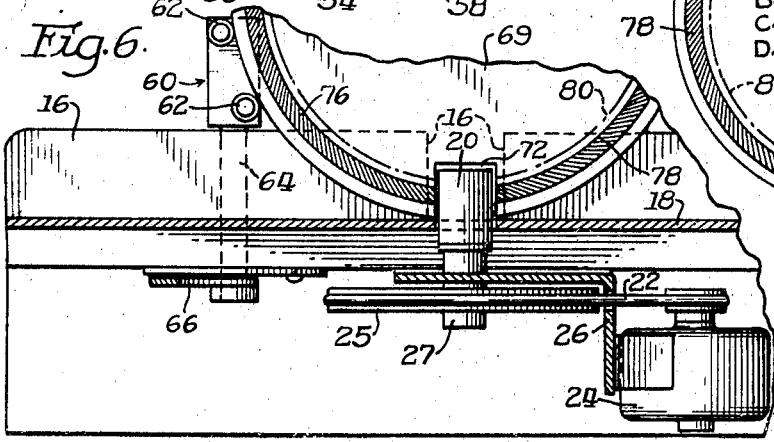
Inventor
Richard M. Davidson United States Patent Office 3,477,141
Patented Nov. 11, 1969

3,477,141
NOTCHED CARD FOR TEACHING MACHINE
Richard M. Davidson, Northbrook, Ill., assignor to Bell & Howell Company, Chicago, Ill., a corporation of Illinois
Filed Oct. 31, 1966, Ser. No. 590,963
Int. Cl. G09b 7/06
U.S. Cl. 35—9                                    11 Claims

ABSTRACT OF THE DISCLOSURE

An information card has a peripheral opening to separate portions of the card engaged by the feed roller of a card handling machine. A circular card guide means is provided on the machine for selective positioning in and out of a card movement path to permit circular cards to be fed by the feed roller of the machine.

---

The present invention relates generally to improvements in teaching devices and the like and more particularly to a new and improved teaching machine and information card providing greater versatility than has been possible in the past.

Teaching machines employing a feed roller for engaging rectangular information cards for feeding the cards through a guide channel past a transducing or readout station are well known to those skilled in the art. Generally speaking, such machines feed the information card past a readout head which reads a sound track containing a magnetic recording of a question or other information. The information is usually printed on the card to stimulate the student both visually and verbally. The feed rollers employed in such machines are driven only after a card is sensed in the channel. Immediately after sensing of the card and energizing of the feed roller, the card engages the feed roller which feeds the card to read the entire sound track without any interruption in this feeding movement.

It is obviously desirable from a teaching standpoint to enable the sound track on the information cards to present more than one "bit" of information, for example, both a question and an answer. However, there should obviously be a pause after verbal presentation of the question to give the student time to consider his own answer before the correct answer is given to him. Obviously, no such pause is possible in devices which uninterruptedly feed the card completely through the teaching machine.

Another shortcoming of the conventional teaching devices of this type resides in the fact that they are restricted to the use of substantially rectangular information cards. This is disadvantageous in some circumstances since it is well known that a longer sound track can be provided on circular information cards than can be incorporated on a rectangular card of the same general size.

It is, accordingly, a primary object of this invention to provide a teaching machine which can use either circular or rectangular information cards interchangeably.

A further object of this invention is the provision of new and improved information cards which automatically control their feed through a teaching machine.

Another object of this invention is the provision of a new and unobvious teaching machine and information card combination of greater versatility than has heretofore been possible.

Still another object of this innvention is the provision of new and unobvious information cards which enable wide versatility in the feed of the cards through a teaching machine without any modification of the teaching machine.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a perspective view of a portion of a teaching machine illustrating a preferred embodiment of one aspect of the invention;

FIG. 2 illustrates a conventional information card;

FIG. 3 illustrates a rectangular information card embodiment of another aspect of the invention;

FIG. 4 illustrates a circular information card embodiment of the invention;

FIG. 5 illustrates a second circular information card embodiment of the invention; and FIG. 6 illustrates the teaching machine of FIG. 1 with portions thereof in a different operative position to enable the use of circular information cards.

The above-discussed objects of this invention are achieved by the use of an information card having an opening separating portions of the card engaged by the feed roller so that the card is fed to a position wherein the opening is in alignment with the feed roller. The opening is of such size that the feed roller no longer engages a card and the card accordingly remains stationary. The card is manually moved to a position wherein the roller again engages the card in order to provide another feed movement of the card. In this manner the magnetically recorded sound track on the card can be correlated with the position of the opening in the card so that the first movement of the card causes a first "bit" of information, such as a question to be verbally presented.

Another feature of this invention is the use of a selectively operable circular card guide means which is movable across the downstream portion of the feed path of a teaching machine to enable use of a circular card in place of a rectangular card. The circular card guide is engaged by a circular card so that rotation of the feed roller engaging the circular card causes the circular card to rotate about its central axis. When it is desired to use rectangular cards, the circular card guide means is moved to a position outside the feed path so that the feed roller linearly feeds the rectangular cards through the teaching machine. The circular cards employ feed control openings cooperating with the feed roller in the same manner as the rectangular cards as discussed above. However, instead of controlling linear movement, as is the case with rectangular cards, the openings on the circular cards control the amount of rotation of the cards.

FIG. 1 illustrates an information card transport means generally designated 10. Transport means 10 includes first and second portions 12 and 14 of a U-shaped card guide channel. Each U-shaped channel portion comprises side walls 16 and a bottom portion 18. A feed roller or capstan 20 is located between channels 12 and 14 and can be either constantly rotated or intermittently powered when a switch (not shown) extending into the channel senses the presence of a card. A belt 22, driven by a motor 24, rotates a pulley 25. For the instant discussion, the feed roller will be discussed as constantly rotating. The pulleys 25 and feed roller 20 are mounted on a common shaft 27. A readout head or sensing means 28 is disposed adjacent to feed roller 20 and is attached to frame 26 by means of a bracket 30.

In a conventional mode of operation, conventional rectangular question cards 31 (FIG. 2) are placed in the first U-shaped channel 12 and are manually moved toward constantly rotated feed roller 20 until the end of the card is engaged between feed roller 20 and readout head 28. It should be noted that the end 32 of the readout head is curved to facilitate feeding of the card. The card is gripped between the feed roller 20 and the head 28 when the roller is powered and is automatically fed into the second U-shaped channel 14 by the feed roller. This feeding movement of the card causes a linear magnetic sound track 33 to be carried past readout head 28. The readout head 28 is connected to conventional amplifier and speaker means (not shown) so that the magnetically recorded information on the sound track is reproduced by the speaker.

The above discussed structure is conventional. Although such devices have functioned adequately for their purpose, it will be apparent that once the card 31 is engaged between feed roller 20 and end 32 of the readout head 28, the conventional rectangular card will be uninterruptedly fed completely past the readout means 28. This mode of operation is satisfactory for merely presenting the question verbally. However, the uninterrupted feed of the card makes it impossible to verbally present both a question and a correct answer in a satisfactory manner. This is true because the time required for a complete traversal of the ordinary rectangular card past the readout means 28 is so brief that the presentation of a question and an answer, while possible, does not allow a sufficient time period in order for the student to consider the question and arrive at his own answer before the recorded answer is presented by the speaker. In other words, the short time during which the linear sound track on a rectangular card can be played is not adequate to allow presentation of the question and the answer plus a sufficient time period for the student to arrive at his own answer. Obviously, the card transport mechanism could be modified so that it would feed a rectangular card a given distance by means of roller 20 and then stop the rotation of roller 20 for a given time period in order for the student to have sufficient time to arrive at his own selected answer. The roller 20 could then be reactivated to drive the answer portion of the sound track past readout means 28 so that the student would know the correctness of his answer. However, such a modification of the device illustrated in FIG. 1 would obviously be expensive and result in a much more complicated structure. The card 48, illustrated in FIG. 3, enables attainment of plural step feeding of the card in the aforementioned manner without any modification of the transport means whatsoever.

The conventional card 31 illustrated in FIG. 2 as a question card consists of a printed question and answer portion 36 and a magnetically recorded sound track 33 which usually has the question recorded therein. The back side of a portion 52 of the card 31 beneath line 50 is engaged by the feed roller 20 to feed the card past readout means 28. Since the feed roller "rolls across" portion 52 of the question card, this portion of the card comprises a feed roller path which the feed roller "traverses" or "rolls across" during the feed of each card. The card 48 illustrated in FIG. 3 comprises a modification of the card illustrated in FIG. 2 so that the sound track 33 and the feed roller path 52 are divided into first and second portions, 56 and 58 respectively, by means of an opening 54 extending inwardly from the bottom edge of the card. The first portion 56 of the sound track contains a recording of the question printed on the upper portion of the card and the second portion 58 contains a recording of the correct answer to the question.

In operation, the student moves the question card 48 into the first channel 12 so that the feed roller engages the forward portion of the card and feeds the first, or question, portion 56 of the card past readout means 28. This provides a verbal enunciation of the question through the speaker (not shown). However, when the opening 54 reaches a position opposite the feed roller, as illustrated by the dashed line position of card 48 in FIG. 1, the feed roller no longer engages the card and feed of the card is terminated for the present time. This is true because the opening 54 has sufficiently large dimensions to completely clear roller 20 as shown in FIG. 1. The card will remain in the dashed line position illustrated in FIG. 1 until it is moved slightly to the left to allow feed roller 22 to engage the right hand portion of the card and feed the card into channel 14. The last mentioned feeding of the card obviously moves the second, or answer portion, 58 of the sound track past readout means 28 so that the answer to the particular question is verbally announced to the student. Obviously, the card can remain in the dwell position illustrated in FIG. 1 for as long as the student desires. It will be obvious that the embodiment of the invention illustrated in FIG. 3 provides a much more effective question and answer presentation than is possible with the conventional prior art card illustrated in FIG. 2. Furthermore, these highly desirable results are achieved without any modification whatsoever of the teaching machine per se.

While the rectangular question cards discussed above are generally satisfactory, it is sometimes desirable to present fairly lengthy magnetically recorded questions and answers which are of too long a duration to be recordable upon a linear track such as those employed on rectangular cards. Obviously, a much longer sound track can be incorporated about the perimeter of a circular card of the same general size as the rectangular cards than is possible with the rectangular cards. A circular card also offers the advantage of ready repetition of the information. The circular card guide generally designated 60 (FIG. 1) comprises means enabling the use of circular question cards in teaching machines which were previously restricted to the use of rectangular question cards.

These results are achieved by the use of pivotally mounted roller members 62 mounted on the machine in any convenient manner for pivotal movement about the axis of shaft 64 by means of a lever 66. Rollers 62 are positionable in first and second positions determined by conventional detent means 68. The first position of rollers 62 is illustrated in FIG. 1 and the second position is the position illustrated in FIG. 6. In the first position, rollers 62 are positioned behind channel 14 a sufficient distance to allow the rectangular cards employed in the machine to be fed completely through channel 14. However, in the second position of rollers 62, said rollers extend across the card feed path and above channel 14 in the manner illustrated in FIG. 6. When in this second position, rollers 62 provide a guide and support for a circular card 69 as shown in FIG. 6. At the same time, the rollers 62 prevent linear movement of the circular card along the U-shaped channel 14.

The circular card 69 has a printed question and multiple choice answer portion 70 and includes a circular sound track about the perimeter of the card as shown in FIG. 4. The sound track is interrupted by an opening 72 as shown in FIG. 4 and an indicator arrow 74 provides an initial orientation indicator for the card so that it can be properly positioned initially in the teaching machine. It should be noted that opening 72 and arrow 74 serve to divide the sound track into first and second portions 76 and 78 respectively. Portion 76 constitutes a question portion in which the question is recorded while portion 78 constitutes an answer portion in which the answer to the particular question is recorded. The back side portion 79 of the circular card extending outwardly from line 80 comprises a feed roller path analogous to feed roller path 52 of the rectangular cards. It should be noted that opening 72 extends inwardly past line 80 and the feed roller path 79.

The circular card illustrated in FIG. 4 is placed in the teaching machine so that the arrow 74 is adjacent the readout means 28. An alignment mark can be provided on the top surface of readout means 28 is desired. The coefficient of friction between the feed roller 20 and the card is sufficiently small so that the card may easily be maintained in this position while the feed roller slips on the feed path portion 79 of the card. However, release of the card by the student permits the feed roller 20 to rotate the card (since the card is engaged against rollers 62 as shown in FIG. 6) and causes the question portion 76 of the sound track to be transported past the readout means 28. However, when opening 72 reaches a position adjacent roller 20, the card will cease to rotate in the same manner as card 48 ceases to move linearly when its opening 54 is adjacent the feed roller 20 as discussed previously. The answer portion of the sound track 78 is caused to be fed past the readout means 28 by giving the card a slight manual rotation to cause roller 20 to re-engage the feed path 79. After the answer has been played back by the speaker, the student manually removes the card. However, should the student desire to hear the question repeated he can leave the card in the device and the question will be repeated with the card feed stopping when opening 72 is again adjacent roller 20.

FIG. 5 illustrates a second circular question card embodiment similar to the embodiment of FIG. 4, but differing therefrom in that a second opening 82 identical with opening 72 is employed in place of arrow 74. In this embodiment the opening 82 is initially placed between the readout means 28 and the feed roller 20 to initiate use of the card. The use of opening 82 avoids the frictional engagement of feed roller 20 with the feed track on the card while the card is being inserted. The question portion 76 in the sound track is caused to feed past the readout means 28 by merely rotating the card so that the roller 20 engages the card. Rotation of the card ceases when the opening 72 arrives at the position adjacent to roller 20 in the manner discussed above with respect to the other circular card. A slight manual rotation of the card causes roller 20 to engage the card and cause the answer portion 78 of the sound track to be fed past the readout means. The opening 82 prevents the automatic replaying of the question following the playback of the answer.

Rollers 62 are spaced apart a distance greater than the width of either opening 72 or 82 so that one of said rollers is always engaged with one edge of the circular card employed in the machine. Otherwise the rollers could stop the rotation of the card by entering one of the openings 72 or 82.

Obviously many modificaitons of the present invention are possible in the light of the above teachings. For example, a solid non-rotatable sheet metal guide or the like could be used in place of rotatable rollers 62.

Another possible embodiment would be the use of means other than pivotable means for moving roller 62 into position across channel 14. For example, rollers 62 could be mounted for movement on a shaft axially positionable by detents or the like in two positions. In fact, practically any conventional means could be used for moving rollers 62 into their position extending across channel 14.

Furthermore, the novel concept of the present invention is suitable for use with cards having optical rather than magnetic sound tracks recorded thereon.

Therefore, it should be understood that the foregoing disclosure relates only to preferred embodiments of the invention and that numerous modifications or alterations may be made therein without departing from the spirit and scope of the invention as set forth in the appended claims.

I claim as my invention:
1. The combination of a card readout machine comprising:
 a readout head;
 a card feed roller;
 guide means for guiding a card into contact with said card feed roller and including selectively operable means movable to an operable position in which it supports a circular card for rotation about its axis to be peripherally engaged by said feed roller, and to a retracted position to permit a rectangular card to be fed along said guide means, and
 a card including:
  a sound track;
  a feed roller engageable feed roller path normally engaged by said feed roller for feeding said card to move said sound track past said readout head;
  said feed roller path being defined by at least two discrete areas separated by an opening in said feed roller path so that said feed roller ceases to feed said card when said opening is fed to a position adjacent said feed roller.
2. The combination of claim 1 wherein said opening is a slot extending inwardly from an edge of said card to a depth greater than the height of said feed roller.
3. In a card readout device of the type having an elongated guide means for guiding an elongated card along a feed path past a feed roller and card readout means, the improvement comprising:
 selectively operable circular card guide and support means mounted adjacent said feed path for movement between a first position in said feed path in which it supports and positions a circular card for rotation about its axis by said feed roller and a retractable position in which it is removed from said feed path so that a rectangular card may be fed along said elongated guide means by said feed roller.
4. The device of claim 3 wherein said selectively operable circular card guide means includes a pivotable mounting for said movable means enabling movement of said movable means between said retracted position and said extended position.
5. The device of claim 4 wherein said movable means comprises plural rollers.
6. The device of claim 5 wherein said pivotable mounting and said plural rollers are downstream along the feed path from said feed roller.
7. A card for use in a machine having a feed roller for feeding the card past a readout head, said card comprising:
 a sound track;
 a feed roller path defined by first and second discrete areas separated by an opening in said card comprising a slot extending inwardly from an edge of said card greater than the height of the readout head and located so as to be engaged by said feed roller so that engagement of said roller with said first area causes a first portion of said sound track to be traversed past said readout head until said opening reaches a position adjacent said feed roller and engagement of said feed roller with said second area causes a second portion of said sound track to be traversed past said readout head.
8. The card of claim 7 wherein said card is substantially circular.
9. The card of claim 8 wherein said opening comprises a slot extending inwardly from the edge of said card.
10. The card of claim 9 wherein said opening extends across said sound track.
11. The card of claim 9 including a second slot extending inwardly from the edge of said card across said feed track to define an initial positioning indication for said card.

References Cited
UNITED STATES PATENTS

| | | | |
|---|---|---|---|
| 1,499,941 | 7/1924 | Marette | 352—241 |
| 2,677,200 | 5/1954 | MacChesney | 35—35 |
| 3,159,078 | 12/1964 | Schwartz et al. | 274—41.4 |

EUGENE R. CAPOZIO, Primary Examiner

W. W. NIELSEN, Assistant Examiner

U.S. Cl. X.R.

35—35; 235—61.11